United States Patent Office 3,379,480
Patented Apr. 23, 1968

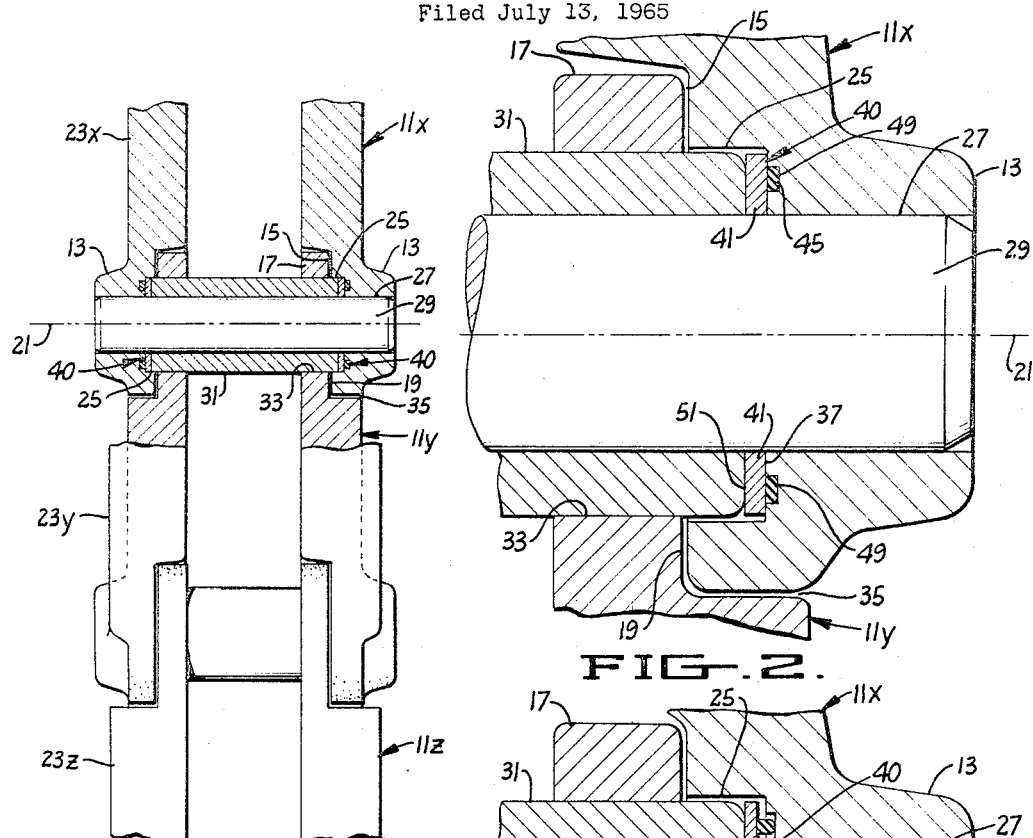
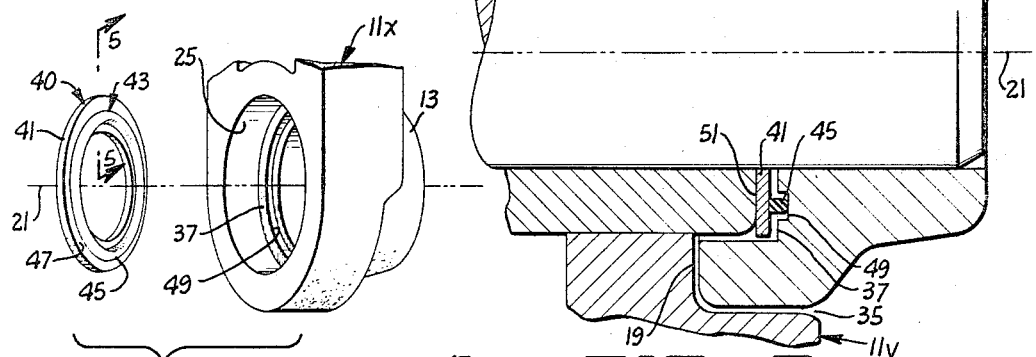
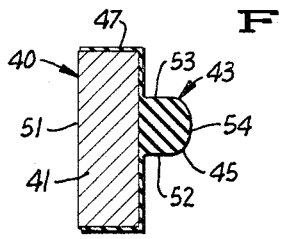

3,379,480
TRACK LINK SEAL
Walter V. Storm, Rolling Hills, Calif., assignor to Westrac Company, Torrance, Calif., a corporation of California
Filed July 13, 1965, Ser. No. 471,533
6 Claims. (Cl. 305—11)

ABSTRACT OF THE DISCLOSURE

A tractor track link seal surrounds a conventional pivot pin and is located between the end of the bushing which receives the pin and the bottom of the counterbore into which the bushing projects. The seal comprises a metal washer which engages the end of the bushing and carries an annular resilient rim which fits into a circular groove in the counterbore. The depth of the groove is less than the thickness of the rim and hence the washer and bushing are biased into sealing engagement.

---

This invention relates to a new and improved seal of the type used on track links of crawler-type tractors. The seal is located about a pivot pin which interconnects the overlapped ends of a pair of track links. The pin connecting each pair of links allows flexing to enable the track to pass around the driver and idler sprockets and to accommodate unevenness of terrain. The transverse track shoes are attached to longitudinal links on either side of the endless chain characteristic of crawler-type tractors. The pin hingedly connects together each adjoining link of both the inner and outer sets of links. At the point where two links are connected, the first or outer link is cut away at its inner face that it may overlap the end of the inner or second link. The inner facing portion of the first link is formed with a counterbore at the point through which the pin passes. The extension of the second link is formed with an enlarged diameter bore into which is pressed a sleeve. The pin is non-rotatively fixed with respect to the first link and oscillates in the sleeve, which is non-rotatively fixed with respect to the second link.

The operating conditions of tracks of this type are about as severe as in any other usage in that various foreign elements, such as sand, mud, rock dust, etc. tend to work their way between the links and to enter the space in the counterbore of the first link into which the end of the sleeve fits rotatively. Unless some means is provided to seal off the pin and counterbore, these highly abrasive elements cause wear of the mating parts and eventually require discarding the worn parts or expensive repairs thereof. Further, the pressure exerted on such materials by the track is very severe, thus forcing finely divided materials between the links. As the foreign material abrades the surfaces heretofore mentioned, the condition worsens, in the respect that space for entry of additional material becomes greater and widens. The limited space available for the sealing means hereinafter described requires special forms of seal of which the present invention is an improvement.

A seal at the point where the sleeve surrounding the pin rotates in the counterbore of the first link is necessary to insure continued flexibility of the links operating under such normally adverse conditions as described above. Previous seals for this purpose have utilized metallic washers or a combination of a metallic washer with a rubber washer. Such seals have proven to be ineffective in that the metallic washer was worn down by oscillation of the sleeve, thereby enlarging the clearance and allowing foreign elements to work their way into the counterbore. The present invention solves this problem by providing a rubber washer and a metal washer of greater outside diameter, with the rubber washer bonded to the metal end washer. When assembled, it is the metal washer which bears against the rotating sleeve. The bonded rubber washer is received by a groove in the bottom of the counterbore of the outer link such that the rubber washer fills the available space in the groove when assembled and exerts a longitudinal resilient thrust forcing the metal washer against the end of the bushing to seal off this space against intrusion of foreign elements such as sand, mud, rock dust, etc.

A feature and advantage of the invention is the fact that the seal is simple and inexpensive, easily installed and replaced, and has a long life.

A further feature of the invention is the fact that the seal herein described adjusts as it wears and as the parts against which it bears wear, so that the life of the seal is prolonged and it continues to function satisfactorily for a much longer period than conventional sealing means which tend to lose their sealing effectiveness as soon as wear commences.

Other objects of the present invention will become apparent upon reading the following specification and referring to the accompanying drawings in which similar characters of reference represent corresponding parts in each of the several views.

In the drawings:

FIG. 1 is a fragmentary top plan view, partly broken away in section, showing assembled track links with seals constructed in accordance with the present invention.

FIG. 2 is an enlarged sectional view of a portion of FIG. 1, showing the assembled structure prior to prolonged use.

FIG. 3 is a view similar to FIG. 2 showing the parts after prolonged wear.

FIG. 4 is an exploded fragmentary perspective view of an outer track link and a bonded metallic and rubber seal constructed in accordance with the present invention.

FIG. 5 is a fragmentary sectional view taken substantially along the line 5—5 of FIG. 4.

The links 11 shown in the accompanying drawing are of a well-known type which are commercially available. In FIG. 1 is shown a portion of upper link 11x, all of link 11y, and a portion of lower link 11z. At the lower end as viewed in FIG. 1, each link has a laterally outwardly offset boss 13 and, further, is relieved at its inner face as shown by reference numeral 15 to permit overlapping of the upper inner end 17 of the adjacent link 11y. Link 11y is relieved at its outer face as indicated by reference numeral 19 to accommodate the lower end of link 11x. It is essential that the two adjacent links, 11x and 11y, as designated in FIG. 1, flex relative to each other about axis 21 as the chain travels around the drive and idler sprockets (not shown) which drive the track. It is also apparent from FIG. 1 that the links 11 are arranged in pairs on each side of the tractor. Thus, link 11x has as its mate link 23x which is the same in construction but oppositely facing.

The inner face of boss 13 is formed with a counterbore 25 of substantial depth surrounding the central hole 27 in boss 13, bore 25 and hole 27 having the common axis 21. Fitting into hole 27 with a force fit is pin 29 which interconnects the two pairs of links 11x and 23x and 11y and 23y. Surrounding pin 29 is a hardened sleeve or bushing 31 which oscillates relative to pin 29. Bushing 31 is forced through and beyond bore 33 in the end 17 of link 11y so that it projects into counterbore 25 but does not reach to the bottom thereof. The diameter of counterbore 25 is slightly greater than the outside diameter of bushing 31 to permit relative oscillation.

Accordingly, bushing 31 turns relative to boss 13 but not relative to end 17, whereas pin 29 turns inside bushing 31 but does not turn relative to boss 13. Bushing 31 enters corresponding counterbore 25 in boss 13 of inner link 23x. Thus, pin 29 is non-rotatively fixed with respect to link 11x and rotates within sleeve 31.

It is apparent that abrasive and other foreign material particularly of the type heretofore described, tend to enter into the crevice indicated by reference numeral 35, between the adjacent links 11x and 11y and also into the interface between offsets 15 and 19 and thence between bushing 31 and the surfaces of counterbore 25. Once such abrasive material enters through the passage heretofore described it works against the relatively oscillating surfaces causing deterioration and wear necessitating repair or replacement of the link members. Because sleeve 31 is considerably harder than links 13, the counterbore tends to wear most rapidly, leading to eventual discard or extensive repair of the links. In accordance with the present invention, a seal designated generally by reference numeral 40 is installed within counterbore 25 between the bottom 37 thereof and the adjacent inner end of bushing 31. Seal 40 is hardened and thus more wear resistant than link 11 and, also, its eventual replacement after it is worn is inexpensive.

The seal comprising the present invention is composed of hard, annular metal washer portion 41 upon which is bonded non-metallic very resilient portion 43. Flat metallic washer 41 has an outside diameter slightly less than the diameter of counterbore 25 and an inside diameter slightly greater than the outside diameter of pin 29. Resilient portion 43 is formed with a thick annular rim 45 and a thin flash of material 47 coating one face and the inner and outer diameter surfaces of metallic washer 41. Rim 45 has a flat base against washer 41, upstanding or normal inner and outer edges 52, 53 and an outwardly convex top 54. Portion 43 may be composed of rubber, plastic or other suitable material which is resilient and has a "memory" for its initial shape.

Circular groove 49 is formed in the bottom 37 of counterbore 25 in link 11x and is positioned to receive extending rim 45 of seal 40. Groove 49 is substantially rectangular in cross-section. The thickness of rim 45 is greater than the depth of groove 49 and the width of rim 45 is less than the width of groove 49. However, the cross-sectional area of groove 49 is only slightly greater than that of rim 45. Thus when assembled rim 45 is flattened and spread to the shape shown in FIG. 2. The resiliency of rim 45 forces washer 41 tightly against the end face of sleeve 31. The rim 45 also prevents rotation of washer 41 relative to link 11x. This sealing action remains effective even as metal washer face 51 is worn down by frictional rotation, as shown in FIG. 3, rim 45 gradually returning to its original shape and exerting a constant end thrust while preventing rotation of the washer and sealing the washer against the bottom of the counterbore. Hence, although foreign material may enter through gap 35, the space between bushing 31 and counterbore bottom 37 is sealed off by the presence of seal 40 held in place by the resilient force of compressed resilient rim 45 in groove 49. In previous devices of this type, as the seal was worn down, a point was reached at which foreign material would come to bear on the essential parts of the structure so as eventually to necessitate replacement or repair. In the present invention as metallic washer 41 wears down only seal 40 is required to be replaced as wear progresses beyond a safe thickness of washer 41. Seal structure 40 is held firm and rigid with respect to counterbore 25 because of the gripping nature of compressed resilient rim 45 in groove 49. Thus, all rotation is confined to the end of bushing 31 rotating against face 51 of hard metallic washer 41. Resilient rim 45 is firmly and permanently affixed to hard metallic washer 41 by being bonderized to three surfaces of washer 41 as shown in FIG. 5. Portion 47 covers metallic washer 41 with approximately a .005" thick coating of rubber or plastic material.

Thus, the present invention insures that the wear of the relative movements between link 11x and pin 29 relative to bushing 31 and link 11y is absorbed by metallic washer surface 51, rather than the members of link assembly against which it fits, thereby preserving the life of links 11 and bushing 31.

Although the foregoing invention has been described in some detail by way of illustration and example for purposes of clarity of understanding, it is understood that certain changes and modifications may be practiced within the spirit of the invention and the scope of the appended claims.

What is claimed is:

1. A track link assembly comprising a first link formed at its first end with an inner face, said first link formed with a first bore extending normal to said inner face and a counterbore in said inner face, a second link having a second end partially overlapping said first end of said first link, and oscillatable relative to said first link about the axis of said first bore, said second end having an outer face parallel and inwardly offset relative to said inner face, said second link formed with a second bore normal to and extending through said outer face coaxial with said first bore, said second bore of a diameter larger than said first bore and slightly less than said counterbore, a bushing force-fit in said second bore with its outer end projecting beyond second outer face and partially into said counterbore and turnable in said counterbore relative to said first link, a pin rotatable within said bushing and having an outer end force-fit in said first bore, a metallic washer in said counterbore around said pin, an annular resilient non-metallic rim bonded on one face of said metallic washer, an annular groove formed in the bottom of said counterbore to receive said resilient rim on said metallic washer, said resilient rim being compressed into said groove to provide an axial force pressing said metallic washer against the end of said bushing, rotatably sealing said first link and said bushing around said pin, the width of said groove being substantially less than the width of said washer.

2. A track link assembly according to claim 1 in which said resilient rim is of a thickness greater than the depth of said groove and in which said resilient rim is of a width less than the width of said groove to permit insertion of said rim into said groove and to permit deformation of said resilient rim partially to fill the space within said groove, creating an axial thrust against said bushing.

3. A track link assembly according to claim 1 in which said resilient rim is bonded onto said metallic washer by means of a thin coating of non-metallic material substantially covering one annular face and the inner and outer diameter surfaces of said washer, said coating being integrally formed with said rim.

4. A track link seal comprising a hard metallic washer, an annular resilient non-metallic rim extending axially outwardly from one annular surface of said washer, and bonding means to firmly bond said rim to said washer, said rim disposed centrally relative to the inner and outer diameters of said washer, the width of said rim being substantially less than the annular width of said washer, said bonding means comprising a thin coating of non-metallic material integral with said rim, said coating substantially covering said annular surface of said washer.

5. A seal according to claim 4 in which the thickness of said rim is about equal to that of said washer.

6. A seal according to claim 4 in which the cross-sectional shape of said rim comprises a flat base against said washer normal edges and an outwardly-convex top.

References Cited

UNITED STATES PATENTS

| | | | |
|---|---|---|---|
| 2,906,562 | 9/1959 | Burgman | 305—11 |
| 3,110,524 | 11/1963 | Zeller | 305—11 |
| 3,206,258 | 9/1965 | Heinrick | 305—11 |
| 3,244,457 | 4/1966 | Ross | 305—11 |
| 3,313,578 | 4/1967 | Wright | 305—58 X |
| 2,574,478 | 11/1951 | Hickman | 277—92 X |
| 2,592,494 | 4/1952 | Ullmann | 277—95 X |
| 2,699,974 | 1/1955 | Deffenbaugh | 305—11 |

FOREIGN PATENTS 944,360  12/1963  Great Britain.

RICHARD J. JOHNSON, *Primary Examiner.*